(12) United States Patent
Hoffjann et al.

(10) Patent No.: US 8,341,773 B2
(45) Date of Patent: Jan. 1, 2013

(54) SYSTEM FOR FLUSHING A VACUUM TOILET AND TOILET COVER FOR A SYSTEM OF THIS TYPE

(75) Inventors: Claus Hoffjann, Hamburg (DE); Joachim Höhne, Hamburg (DE); Marc Scheel, Hamburg (DE)

(73) Assignee: Airbus Operations GmbH (DE)

( * ) Notice: Subject to any disclaimer, the term of this patent is extended or adjusted under 35 U.S.C. 154(b) by 799 days.

(21) Appl. No.: 12/084,943

(22) PCT Filed: Nov. 16, 2006

(86) PCT No.: PCT/EP2006/011011
§ 371 (c)(1),
(2), (4) Date: Aug. 25, 2009

(87) PCT Pub. No.: WO2007/057190
PCT Pub. Date: May 24, 2007

(65) Prior Publication Data
US 2009/0300834 A1     Dec. 10, 2009

(30) Foreign Application Priority Data
Nov. 17, 2005  (DE) .......................... 10 2005 054 887

(51) Int. Cl.
*E03D 11/00* (2006.01)
(52) U.S. Cl. ........................................................ 4/431
(58) Field of Classification Search ............ 4/231, 242.1
See application file for complete search history.

(56) References Cited

U.S. PATENT DOCUMENTS

| | | | |
|---|---|---|---|
| 4,291,422 A * | 9/1981 | Shoemaker et al. | 4/246.2 |
| 5,245,711 A | 9/1993 | Oldfelt et al. | |
| 5,421,040 A | 6/1995 | Oldfelt et al. | |
| 6,256,802 B1 | 7/2001 | Stradinger | |
| 6,351,856 B1 * | 3/2002 | Browne | 4/246.2 |
| 6,434,759 B1 | 8/2002 | Pondelick et al. | |
| 6,907,621 B2 * | 6/2005 | Stemen | 4/246.1 |

FOREIGN PATENT DOCUMENTS

| | | |
|---|---|---|
| DE | 2244049 | 3/1974 |
| DE | 68912493 T2 | 9/1989 |
| DE | 10126145 | 2/2002 |
| EP | 0 586 826 | 3/1994 |

* cited by examiner

*Primary Examiner* — Lori Baker
(74) *Attorney, Agent, or Firm* — Lerner, David, Littenberg, Krumholz & Mentlik, LLP

(57) ABSTRACT

A system for flushing a vacuum toilet contains a flushing water reservoir container, which may be filled with flushing water, a toilet bowl, which is connectable using a vacuum wastewater line and via a flushing valve to a vacuum system, and a spray device, situated in the toilet bowl, which is connected via a Venturi nozzle to the flushing water reservoir container. A partial vacuum is generated in the vacuum wastewater line when the flushing valve is open, which generates an airflow, by which flushing water contained in the flushing water reservoir container is suctioned, sprayed via the spray device into the toilet bowl, and suctioned into the vacuum wastewater line.

4 Claims, 2 Drawing Sheets

SYSTEM FOR FLUSHING A VACUUM TOILET AND TOILET COVER FOR A SYSTEM OF THIS TYPE

Figure 1:
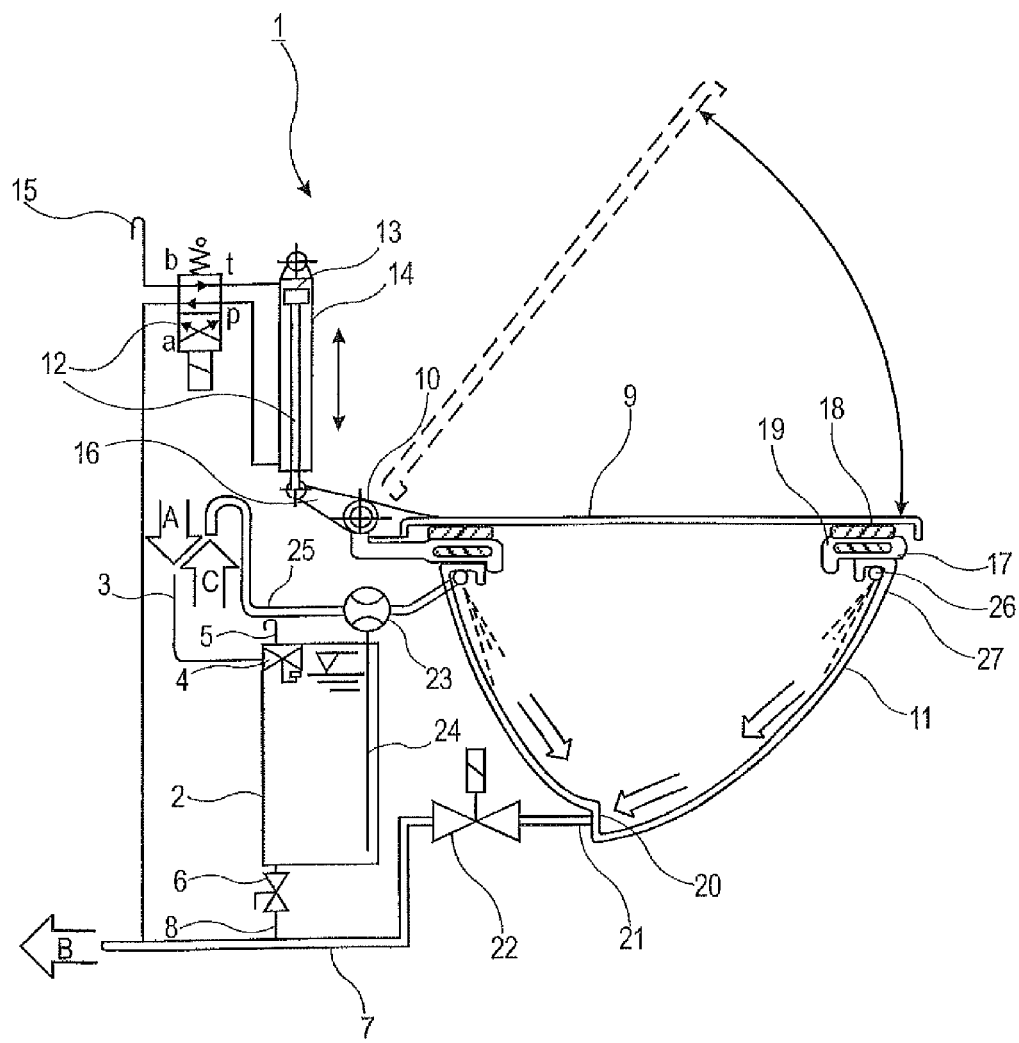

This application claims the benefit of the filing date of German Patent Application No. 10 2005 054 887.3 filed Nov. 17, 2005, the disclosure of which is hereby incorporated herein be reference.

The present invention relates to a system for flushing a vacuum toilet and a toilet cover for a system of this type, particularly for use in toilet systems of aircraft, trains, ships, etc.

Toilet systems of this type are essentially based on the vacuum principle. Feces are drained via a vacuum system from the toilet bowl into a collection container. Special toilets are required for this purpose, which support this function. A specific quantity of fresh water is typically supplied to such a toilet, which is then drained together with the feces via the vacuum system into the collection container, which is under a partial vacuum.

A disadvantage of these known toilet systems is that the flushing water must have pressure applied to it using an additional pump, for example, before it is supplied to the toilet.

An object of the present invention is to provide a system for flushing a vacuum toilet, in which the supply of water for flushing support occurs automatically, i.e., without an additional pump or pressure impingement of a container, as the feces are suctioned out.

Furthermore, it is an object of the present invention to provide a toilet cover for a system of this type which further supports the flushing function of the system.

Solutions to the stated objects are specified in the independent claims. Refinements of the present invention may be inferred from the dependent claims.

A system for flushing a vacuum toilet according to an exemplary embodiment comprises a flushing water reservoir container, which may be filled with flushing water, a toilet bowl, which is connectable using a vacuum wastewater line to a vacuum system via a flushing valve; and a spray device situated in the toilet bowl, which is connected via a Venturi nozzle to the flushing water reservoir container. When the flushing valve is opened, a partial vacuum is generated in the vacuum wastewater line. Because of the pressure differential between vacuum and cabin air, an airflow is generated, through which the flushing water contained in the flushing water reservoir container is suctioned, sprayed via the spray device into the toilet bowl, and suctioned into the vacuum water line.

A system according to an exemplary embodiment of the present invention comprises a toilet cover which closes automatically, and which supports the flushing function of the system and simultaneously is used for noise damping of the airflow triggered by the vacuum. The toilet cover seals the toilet bowl airtight during the flushing procedure.

The toilet cover is closed by a pneumatic cylinder, which is impinged by partial vacuum and, in addition, is ventilated by ambient air. The pneumatic cylinder is preferably controlled by a solenoid valve, which alternately opens and closes the operating media of partial vacuum and ambient air.

The toilet cover according to an exemplary embodiment of the present invention may comprise a cleaning device for cleaning a toilet seat. The cleaning device especially has a cleaning sponge and a drive, which moves the cleaning sponge over an upper surface (seat surface) of the toilet seat.

According to a preferred exemplary embodiment, the drive is a rotational drive situated concentrically to the toilet cover and the toilet seat, the toilet cover and the toilet seat being implemented as circular.

According to an exemplary embodiment of the present invention, no preliminary pressure is required for the flushing water and thus no additional pump is necessary. Using the toilet cover according to an exemplary embodiment of the present invention, it may be possible to integrate a cleaning device for cleaning the toilet seat into the system according to the present invention.

Preferred exemplary embodiments of the present invention are described with reference to the attached drawing in the following.

Figure 2:
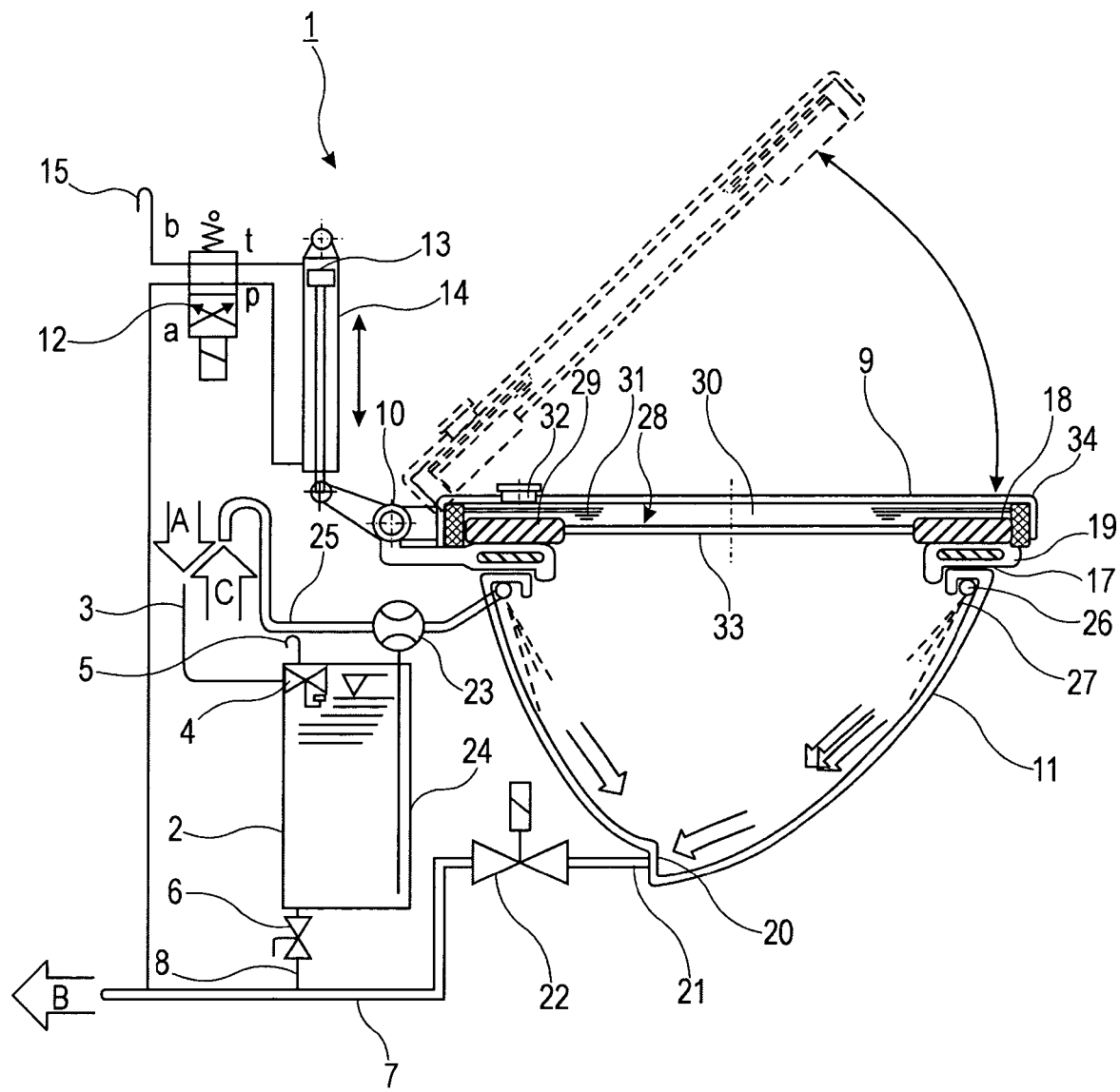

FIG. 1 shows a schematic side view of a system according to a preferred exemplary embodiment; and FIG. 2 shows the system from FIG. 1 having a toilet cover according to a preferred exemplary embodiment of the present invention.

In the following, identical reference numerals are used in the figures in the various views for identical or corresponding components.

FIG. 1 shows a schematic side view of a system 1 according to a preferred exemplary embodiment of the present invention.

FIG. 1 shows a water reservoir container 2, which may be filled via a water line 3 and a floater valve 4 with freshwater or purified gray water (as shown by the arrow A). Upon reaching an upper fill level, the floater valve 4 closes automatically. The water reservoir container 2 is ventilated and/or aerated during a filling or emptying procedure via an air line 5. The quantity of water in the water reservoir container 2 preferably corresponds at least to the quantity of water required for a flushing procedure.

As shown in FIG. 1, the water reservoir container 2 may have a hand valve 6 for drainage purposes, the water reservoir container 2 being connected via this hand valve 6 via a drainage line 8 to a vacuum system 7.

The system according to the present invention also comprises a toilet cover 9, which may be pivoted around a pivot axis 10, to cover a toilet bowl 11, as shown in FIG. 1, or to open it, as shown by dashed lines in FIG. 1.

The flushing procedure is preferably initiated by closing the toilet cover 9, a solenoid valve (or magnetic valve) 12 being switched for this purpose so that a vacuum (arrow B) generated by the vacuum system 7 moves a piston 13 of a pneumatic cylinder 14 in such a way that the function "close cover" is executed thereby.

According to FIG. 1, a movement of the piston 13 upward is necessary to close the toilet cover 9, which requires that the solenoid valve 12 is electrically actuated via an actuator against a restoring spring, to release the path a-t for the vacuum B to the solenoid valve 12 and, in addition, to ensure the path p-b for the ventilation of the piston rear of the piston 13 via a ventilation line 15.

The piston 13 is connected via a connection element 16 to the toilet cover 9. One end of the connection element 16 is connected to one end of the piston 13 so it is rotatable, and the other end of the connection element 16 is connected so it is rotatable to the end of the toilet cover 9, which is attached to the toilet bowl 11.

As shown in FIG. 1, the toilet cover 9 forms a seal in relation to the toilet bowl 11 via gaskets 17, 18 and an interposed toilet seat 19.

The toilet cover 9 and the toilet seat 19 have the same axis of rotation 10 for their closing movement, for example.

As shown in FIG. 1, the toilet bowl 11 has an opening 20 in its floor area, via which feces may be removed from the toilet bowl 11, for example, as explained in greater detail in the following.

The opening 20 of the toilet bowl 11 is connected via a vacuum wastewater line 21 and a flushing valve 22 to the vacuum system 7. Upon opening the flushing valve 22, the toilet bowl 11 is impinged by vacuum B from the vacuum system 7. In aircraft, this means a pressure difference of approximately 300-600 mbar between cabin pressure and air pressure in the vacuum system in flight. For the feces transport, this means that air and flushing water must flow down into the toilet bowl 11 to ensure the feces transport.

Water is drawn from the water reservoir container 2 via a suction pipe 24 and a pipeline 25 into a spray device 26 situated in the toilet bowl 11 via a Venturi nozzle 23 with the aid of the vacuum B by the airflow C, which is generated by the vacuum B, and drawn by spray nozzles 27 of the spray device 26 into the toilet bowl 11, until the water reservoir container 2 is completely emptied. The feces and the water are then transported off into the vacuum system 7 and/or the vacuum wastewater line 21 by the airflow C, which then exists exclusively.

The spray device 26 comprises a spray ring, for example.

After the feces and the water are transported off, the flushing valve 22 is closed again and the toilet cover 9 is automatically reopened, for example, for further use of the toilet.

To open the cover, the solenoid valve 12 is disconnected from current. The restoring spring of the solenoid valve returns the valve into it starting position. The piston 13 of the pneumatic cylinder 14 is impinged with vacuum B from the vacuum system 7 via the path a-p, the piston 15 moving downward due to ventilation via the path b-t and the ventilation line 15 and thus opening the toilet cover 9 and fixing it in the open position.

FIG. 2 shows the system from FIG. 1 having a toilet cover 9 according to a preferred exemplary embodiment of the present invention.

According to the preferred exemplary embodiment, the toilet cover 9 contains a cleaning device 28, which is integrated in the cover 9, for example.

According to the preferred exemplary embodiment, the cleaning device 28 comprises a rotating cleaning sponge 29 situated concentrically over the toilet seat 19 or a comparable device for cleaning the toilet seat surface. The cleaning device 28 also comprises a rotational drive 30, a reservoir store 31 for a cleaning liquid, a filler connecting part 32 for the cleaning liquid, and a lower protective cover 33 as well as a lateral seal 34.

According to this preferred exemplary embodiment, the toilet cover 9 and the toilet seat 19 are circularly shaped.

The cleaning liquid to be used has the properties of being disinfectant, rapidly drying, nontoxic, and skin-compatible, for example.

The cleaning procedure occurs when the cover is closed in the form of a revolution of the concentrically rotating cleaning sponge 29, only sufficient cleaning liquid being placed on the toilet seat 19 to wet the surface completely. After the opening of the toilet cover 9, the wetted surface dries immediately, so that usage is immediately possible.

Although the present invention was described above with reference to preferred exemplary embodiments, it is obvious that changes and modifications may be performed without leaving the protective scope of the present invention. For example, the toilet cover and the toilet seat may have any arbitrary shape and the drive of the cleaning device may be adapted according to this shape. Furthermore, multiple cleaning brushes may be contained in the toilet cover, or more than one revolution of the cleaning brush may occur to clean the toilet seat.

Moreover, it is to be noted that "comprising" does not exclude other elements or steps and "a" or "an" does not exclude multiples. Furthermore, it is to be noted that features or steps which have been described with reference to one of the above exemplary embodiments may also be used in combination with other features or steps of other exemplary embodiments described above. Reference numerals in the claims are not to be viewed as a restriction.

REFERENCE NUMERALS 1 system
2 water reservoir container
3 water line
4 floater valve
5 ventilation line
6 hand valve
7 vacuum system
8 drainage line
9 toilet cover
10 pivot axis
11 toilet bowl
12 solenoid valveb/magnetic valve
13 piston
14 pneumatic cylinder
15 ventilation line
16 connection element
17, 18 gaskets
19 toilet seat
20 opening
21 vacuum wastewater line
22 flushing valve
23 Venturi nozzle
24 suction pipe
25 pipeline
26 spray device
27 spray nozzle
28 cleaning device
29 cleaning sponge
30 rotational drive
31 reservoir store
32 filling connecting piece
33 lower protective cover
34 lateral seal
A fresh water
B vacuum
C airflow

The invention claimed is:

1. A system for flushing a vacuum toilet, comprising:
a flushing water reservoir container,
a toilet bowl,
a spray device,
a vacuum wastewater line,
a flushing valve,
a Venturi nozzle, and
a toilet cover,
wherein the flushing water reservoir container is fillable with flushing water;
wherein the toilet bowl is connectable via the vacuum wastewater line and via the flushing valve to a vacuum system, and
wherein the spray device, arranged in the toilet bowl, is connected via the Venturi nozzle to the flushing water reservoir container, wherein the flushing valve, when opened, is configured to generate a partial vacuum in the vacuum wastewater line, thereby generating an airflow therethrough, wherein the system is configured such that upon opening of the flushing valve, the flushing water contained in the flushing water reservoir container is suctioned via the Venturi nozzle, with the aid of the vacuum by the airflow, sprayed via the spray device into the toilet bowl, and suctioned into the vacuum wastewater line, and wherein the toilet cover is configured to close the toilet bowl airtight during the flushing procedure.

2. The system of claim 1, wherein the toilet cover is closed by a pneumatic cylinder, which is impinged by partial vacuum and, in addition, is aerated by ambient air.

3. The system of claim 2, wherein the pneumatic cylinder is controlled by a solenoid valve, which alternately opens and closes the operating media of partial vacuum and ambient pressure.

4. The system of claim 1, further comprising a toilet seat, wherein the toilet cover rests on the toilet seat during the flushing procedure.

* * * * *